United States Patent
Park et al.

(10) Patent No.: US 11,567,388 B2
(45) Date of Patent: Jan. 31, 2023

(54) COMPOSITE ELECTROPHORETIC PARTICLES AND VARIABLE TRANSMISSION FILMS CONTAINING THE SAME

(71) Applicant: E INK CORPORATION, Billerica, MA (US)

(72) Inventors: Jin-Gyu Park, Lexington, MA (US); Richard J. Paolini, Jr., Framingham, MA (US); Peter Carsten Bailey Widger, Nashua, NH (US); Jillian Smith, Dorchester, MA (US); Jay William Anseth, Canton, MA (US); Craig A. Herb, Medford, MA (US); George G. Harris, Woburn, MA (US); Mark Benjamin Romanowsky, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 487 days.

(21) Appl. No.: 16/776,042

(22) Filed: Jan. 29, 2020

(65) Prior Publication Data
US 2020/0272017 A1    Aug. 27, 2020

Related U.S. Application Data

(60) Provisional application No. 62/809,978, filed on Feb. 25, 2019.

(51) Int. Cl.
*G02F 1/167* (2019.01)
*G02F 1/1676* (2019.01)
(Continued)

(52) U.S. Cl.
CPC ............... *G02F 1/167* (2013.01); *C08K 3/04* (2013.01); *C08L 33/12* (2013.01); *G02F 1/1676* (2019.01);
(Continued)

(58) Field of Classification Search
CPC .... G02F 1/167; G02F 1/16757; G02F 1/1676; G02F 1/1681; G02F 2001/1678;
(Continued)

(56) References Cited

U.S. PATENT DOCUMENTS

| 3,726,700 A | 4/1973 | Wildt |
| 4,285,801 A | 8/1981 | Chiang |

(Continued)

OTHER PUBLICATIONS

Korean Intellectual Property Office, PCT/US2020/015726, International Search Report and Written Opinion, dated May 29, 2020.

(Continued)

*Primary Examiner* — Tuyen Tra
(74) *Attorney, Agent, or Firm* — Brian D. Bean (57) ABSTRACT

An electro-optic media includes either a plurality of microcapsules in a binder, a polymeric sheet containing sealed microcells, or droplets in a continuous polymeric phase. Each of the microcapsules, microcells, or droplets contain a dispersion that includes a plurality of charged composite particles and a suspending fluid, and the charged particles move through the suspending fluid under the influence of an electric field. The composite particles include one or more types of pigment particles that are at least partially coated with a polymeric material. Each of the binder, polymeric sheet, continuous polymeric phase, the charged composite particles, and the suspending fluid have an index of refraction, and a difference between the index of refraction of the composite particles and at least one of the binder, polymeric sheet, continuous polymeric phase, and solvent is less than or equal to 0.05 at 550 nm.

23 Claims, 7 Drawing Sheets

(51) Int. Cl.
*G02F 1/16757* (2019.01)
*C08L 33/12* (2006.01)
*G02F 1/1681* (2019.01)
*C08K 3/04* (2006.01)
*G02F 1/1675* (2019.01)

(52) U.S. Cl.
CPC ........ *G02F 1/1681* (2019.01); *G02F 1/16757* (2019.01); *C08K 2201/003* (2013.01); *G02F 2001/1678* (2013.01); *G02F 2202/022* (2013.01); *G02F 2203/01* (2013.01)

(58) Field of Classification Search
CPC . G02F 2202/022; G02F 2203/01; C08K 3/04; C08K 2201/003; C08K 9/10; C08L 33/12
USPC .......................... 359/237, 238, 240, 245, 296
See application file for complete search history.

(56) References Cited

U.S. PATENT DOCUMENTS

| | | |
|---|---|---|
| 4,727,011 A | 2/1988 | Mahabadi et al. |
| 4,891,245 A | 1/1990 | Micale |
| 5,023,159 A | 6/1991 | Ong et al. |
| 5,264,315 A | 11/1993 | Tan et al. |
| 5,930,026 A | 7/1999 | Jacobson et al. |
| 5,961,804 A | 10/1999 | Jacobson et al. |
| 6,017,584 A | 1/2000 | Albert et al. |
| 6,067,185 A | 5/2000 | Albert et al. |
| 6,120,588 A | 9/2000 | Jacobson |
| 6,120,839 A | 9/2000 | Comiskey et al. |
| 6,130,774 A | 10/2000 | Albert et al. |
| 6,172,798 B1 | 1/2001 | Albert et al. |
| 6,249,271 B1 | 6/2001 | Albert et al. |
| 6,262,706 B1 | 7/2001 | Albert et al. |
| 6,262,833 B1 | 7/2001 | Loxley et al. |
| 6,300,932 B1 | 10/2001 | Albert |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,392,785 B1 | 5/2002 | Albert et al. |
| 6,392,786 B1 | 5/2002 | Albert |
| 6,459,418 B1 | 10/2002 | Comiskey et al. |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,652,075 B2 | 11/2003 | Jacobson |
| 6,665,042 B1 | 12/2003 | Marshall et al. |
| 6,693,620 B1 | 2/2004 | Herb et al. |
| 6,706,818 B2 | 3/2004 | Ishihara et al. |
| 6,721,083 B2 | 4/2004 | Jacobson et al. |
| 6,727,881 B1 | 4/2004 | Albert et al. |
| 6,822,782 B2 | 11/2004 | Honeyman et al. |
| 6,831,771 B2 | 12/2004 | Ho et al. |
| 6,839,158 B2 | 1/2005 | Albert et al. |
| 6,866,760 B2 | 3/2005 | Paolini Jr. et al. |
| 6,870,661 B2 | 3/2005 | Pullen et al. |
| 6,914,713 B2 | 7/2005 | Chung et al. |
| 6,922,276 B2 | 7/2005 | Zhang |
| 6,927,892 B2 | 8/2005 | Ho et al. |
| 6,956,690 B2 | 10/2005 | Yu et al. |
| 6,958,848 B2 | 10/2005 | Cao et al. |
| 6,958,849 B2 | 10/2005 | Chen et al. |
| 6,982,178 B2 | 1/2006 | LeCain et al. |
| 6,987,603 B2 | 1/2006 | Paolini, Jr |
| 7,002,728 B2 | 2/2006 | Pullen |
| 7,012,600 B2 | 3/2006 | Zehner |
| 7,038,655 B2 | 5/2006 | Herb |
| 7,052,766 B2 | 5/2006 | Zang et al. |
| 7,061,663 B2 | 6/2006 | Cao et al. |
| 7,071,913 B2 | 7/2006 | Mbert |
| 7,072,095 B2 | 7/2006 | Liang et al. |
| 7,075,502 B1 | 7/2006 | Drzaic |
| 7,079,305 B2 | 7/2006 | Paolini, Jr. et al. |
| 7,109,968 B2 | 9/2006 | Albert et al. |
| 7,110,162 B2 | 9/2006 | Wu et al. |
| 7,110,164 B2 | 9/2006 | Paolini, Jr. et al. |
| 7,113,323 B2 | 9/2006 | Ho et al. |
| 7,116,318 B2 | 10/2006 | Amundson et al. |
| 7,141,688 B2 | 11/2006 | Feng et al. |
| 7,142,351 B2 | 11/2006 | Chung et al. |
| 7,144,942 B2 | 12/2006 | Zang et al. |
| 7,170,670 B2 | 1/2007 | Webber |
| 7,180,649 B2 | 2/2007 | Morrison et al. |
| 7,184,197 B2 | 2/2007 | Liang et al. |
| 7,202,991 B2 | 4/2007 | Zhang et al. |
| 7,226,550 B2 | 6/2007 | Hou et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,242,513 B2 | 7/2007 | Albert et al. |
| 7,247,379 B2 | 7/2007 | Pullen et al. |
| 7,277,218 B2 | 10/2007 | Hwang et al. |
| 7,286,279 B2 | 10/2007 | Yu et al. |
| 7,304,634 B2 | 12/2007 | Albert et al. |
| 7,312,784 B2 | 12/2007 | Baucom et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,375,875 B2 | 5/2008 | Whitesides et al. |
| 7,382,514 B2 | 6/2008 | Hsu et al. |
| 7,390,901 B2 | 6/2008 | Yang et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,453,445 B2 | 11/2008 | Amundson |
| 7,473,782 B2 | 1/2009 | Yang et al. |
| 7,477,444 B2 | 1/2009 | Cao et al. |
| 7,532,388 B2 | 5/2009 | Whitesides et al. |
| 7,532,389 B2 | 5/2009 | Li et al. |
| 7,535,624 B2 | 5/2009 | Amundson et al. |
| 7,561,324 B2 | 7/2009 | Duthaler et al. |
| 7,572,394 B2 | 8/2009 | Gu et al. |
| 7,576,904 B2 | 8/2009 | Chung et al. |
| 7,580,180 B2 | 8/2009 | Ho et al. |
| 7,679,814 B2 | 3/2010 | Paolini, Jr. et al. |
| 7,715,088 B2 | 5/2010 | Liang et al. |
| 7,741,384 B2 | 6/2010 | Liu |
| 7,746,544 B2 | 6/2010 | Comiskey et al. |
| 7,767,112 B2 | 8/2010 | Hou et al. |
| 7,839,564 B2 | 11/2010 | Whitesides et al. |
| 7,848,006 B2 | 12/2010 | Wilcox et al. |
| 7,848,007 B2 | 12/2010 | Paolini, Jr. et al. |
| 7,903,319 B2 | 3/2011 | Honeyman et al. |
| 7,910,175 B2 | 3/2011 | Webber |
| 7,951,938 B2 | 5/2011 | Yang et al. |
| 7,952,790 B2 | 5/2011 | Honeyman et al. |
| 7,955,532 B2 | 6/2011 | Liang et al. |
| 3,009,348 A1 | 8/2011 | Zehner et al. |
| 8,018,640 B2 | 9/2011 | Whitesides et al. |
| 8,035,886 B2 | 10/2011 | Jacobson |
| 8,115,729 B2 | 2/2012 | Danner et al. |
| 8,119,802 B2 | 2/2012 | Moonen et al. |
| 8,129,655 B2 | 3/2012 | Jacobson et al. |
| 8,199,395 B2 | 6/2012 | Whitesides et al. |
| 8,257,614 B2 | 9/2012 | Gu et al. |
| 8,270,064 B2 | 9/2012 | Feick et al. |
| 8,305,341 B2 | 11/2012 | Arango et al. |
| 8,361,620 B2 | 1/2013 | Zang et al. |
| 8,363,306 B2 | 1/2013 | Du et al. |
| 8,390,918 B2 | 3/2013 | Wilcox et al. |
| 8,446,664 B2 | 5/2013 | Chen et al. |
| 8,576,476 B2 | 11/2013 | Telfer et al. |
| 8,582,196 B2 | 11/2013 | Walls et al. |
| 8,593,718 B2 | 11/2013 | Comiskey et al. |
| 8,654,436 B1 | 2/2014 | Feick |
| 8,703,865 B2 | 4/2014 | Ganschow et al. |
| 8,902,491 B2 | 12/2014 | Wang et al. |
| 8,961,831 B2 | 2/2015 | Du et al. |
| 9,005,494 B2 | 4/2015 | Valianatos et al. |
| 9,052,564 B2 | 6/2015 | Sprague et al. |
| 9,114,663 B2 | 8/2015 | Ho et al. |

(56) References Cited

U.S. PATENT DOCUMENTS

| | | | |
|---|---|---|---|
| 9,158,174 B2 | 10/2015 | Walls et al. | |
| 9,279,906 B2 | 3/2016 | Kang | |
| 9,341,915 B2 | 5/2016 | Yang et al. | |
| 9,348,193 B2 | 5/2016 | Hiji et al. | |
| 9,361,836 B1 | 6/2016 | Telfer et al. | |
| 9,366,935 B2 | 6/2016 | Du et al. | |
| 9,372,380 B2 | 6/2016 | Du et al. | |
| 9,382,427 B2 | 7/2016 | Du et al. | |
| 9,423,666 B2 | 8/2016 | Wang et al. | |
| 9,428,649 B2 | 8/2016 | Li et al. | |
| 9,557,623 B2 | 1/2017 | Wang et al. | |
| 9,594,260 B2 | 3/2017 | Farrand et al. | |
| 9,664,978 B2 | 5/2017 | Arango et al. | |
| 9,670,367 B2 | 6/2017 | Li et al. | |
| 9,688,859 B2 | 6/2017 | Yezek et al. | |
| 9,726,957 B2 | 8/2017 | Telfer et al. | |
| 9,778,537 B2 | 10/2017 | Wang et al. | |
| 9,835,926 B2 | 12/2017 | Sprague et al. | |
| 9,921,451 B2 | 3/2018 | Telfer et al. | |
| 10,126,627 B2 | 11/2018 | Wang et al. | |
| 10,174,232 B2 | 1/2019 | Bzowej et al. | |
| 10,324,353 B2 | 6/2019 | O'Keeffe | |
| 10,444,590 B2 | 10/2019 | Duthaler et al. | |
| 2003/0048522 A1 | 3/2003 | Liang et al. | |
| 2003/0063369 A1* | 4/2003 | Kawai | G02F 1/16757 |
| | | | 359/296 |
| 2003/0151029 A1 | 8/2003 | Hsu et al. | |
| 2003/0164480 A1 | 9/2003 | Wu et al. | |
| 2004/0030125 A1 | 2/2004 | Li et al. | |
| 2005/0012980 A1 | 1/2005 | Wilcox et al. | |
| 2005/0156340 A1 | 7/2005 | Valianatos et al. | |
| 2007/0091417 A1 | 4/2007 | Cao et al. | |
| 2007/0107635 A1 | 5/2007 | Soane et al. | |
| 2008/0130092 A1 | 6/2008 | Whitesides et al. | |
| 2009/0009852 A1 | 1/2009 | Honeyman et al. | |
| 2009/0122389 A1 | 5/2009 | Whitesides et al. | |
| 2009/0206499 A1 | 8/2009 | Whitesides | |
| 2009/0225398 A1 | 9/2009 | Duthaler et al. | |
| 2010/0148385 A1 | 6/2010 | Balko et al. | |
| 2011/0217639 A1 | 9/2011 | Sprague | |
| 2011/0286081 A1 | 11/2011 | Jacobson | |
| 2012/0049125 A1 | 3/2012 | Du et al. | |
| 2012/0147300 A1* | 6/2012 | Fukuda | G02B 5/3083 |
| | | | 349/194 |
| 2012/0171373 A1 | 7/2012 | Xu et al. | |
| 2013/0161565 A1 | 6/2013 | Laxton | |
| 2013/0193385 A1 | 8/2013 | Li et al. | |
| 2013/0244149 A1 | 9/2013 | Wang et al. | |
| 2014/0011913 A1 | 1/2014 | Du et al. | |
| 2014/0078024 A1 | 3/2014 | Paolini, Jr. et al. | |
| 2014/0078573 A1 | 3/2014 | Comiskey et al. | |
| 2014/0078576 A1 | 3/2014 | Sprague | |
| 2014/0078857 A1 | 3/2014 | Nelson et al. | |
| 2014/0104674 A1 | 4/2014 | Ting et al. | |
| 2014/0231728 A1 | 8/2014 | Du et al. | |
| 2015/0177590 A1 | 6/2015 | Laxton | |
| 2015/0185509 A1 | 7/2015 | Wang et al. | |
| 2015/0241754 A1 | 8/2015 | Du et al. | |
| 2015/0301425 A1 | 10/2015 | Du et al. | |
| 2016/0170106 A1 | 6/2016 | Wang et al. | |
| 2017/0351155 A1 | 12/2017 | Paolini, Jr. et al. | |
| 2018/0366069 A1 | 12/2018 | Widger et al. | |

OTHER PUBLICATIONS

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Lelu, S. et al., "Encapsulation of an organic phthalocyanine blue pigment into polystyrene latex particles using a miniemulsion polymerization", Polymer International 52:542-547 (2003).

Kobaslija, Muris et al., "Polyurea Microcapsules from Oil-in-Oil Emulsions via Interfacial Polymerization", Macromolecules, vol. 39, Issue 19, pp. 6371-6375 (Sep. 2006).

* cited by examiner

COMPOSITE ELECTROPHORETIC PARTICLES AND VARIABLE TRANSMISSION FILMS CONTAINING THE SAME

REFERENCE TO RELATED APPLICATIONS

This application claims priority to U.S. Patent Application No. 62/809,978, filed Feb. 25, 2019, which is incorporated by reference in its entirety.

BACKGROUND OF INVENTION

This invention relates to variable transmission devices. More specifically, this invention relates to variable transmission devices containing electrophoretic media comprising composite particles that may improve the optical performance of the variable transmission device.

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

U.S. Pat. No. 7,327,511 describes variable transmission devices including charged pigment particles that are distributed in a non-polar solvent and encapsulated. These variable transmission devices can be driven to an open state with an AC driving voltage whereby the charged pigment particles are driven to the capsule walls. Accordingly, such variable transmission devices are useful for viewing surfaces where it is desirable to alter the transmissivity at will, such as privacy glass, sunroofs, and windows on buildings.

U.S. Pat. No. 7,327,511 also describes various factors which are important in adapting electrophoretic media for optimum performance in light modulators. One important factor is minimization of haze. In this application, "haze" refers to the percentage of diffuse transmitted light (light that is scattered as it is transmitted), compared to total transmitted light. When designing light modulators that can be electrically switched from an open, clear state to a closed opaque state, it is desirable that the open state have a haze of less than 10 percent, more preferably less than 2 percent.

The pigments used in VT devices, such as carbon black for example, attenuates the transmitted light by a combination of scattering and absorption. In general, the smallest grades of carbon black particles provide the most effective attenuation of light. The nature of the light scattering is also affected by the size of the aggregates of these particles. As the aggregates increase in size, more and more of the light is scattered in the forward direction. This scattered light results in the appearance of haze in the window. The smallest particles tend to have the smallest aggregates, leading to the smallest amount of haze. Since the reduction of haze is preferred in VT applications, it may be desired to use the smallest particle (or aggregate) size possible. However, the electrophoretic manipulation of particles improves as their size increases, with the smallest, most effective light blockers, being very difficult to control. Since switching speed and ultimate dynamic range of the VT windows are also important parameters, larger particles may be desired; therefore, the ability to reduce haze based on particle size may be limited by the requirement of minimum particle sizes needed to control the speed of optical switching in a VT device.

Encapsulated particle-based variable transmission devices may be bistable. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. Bistability may be enhanced by adding a flocculating agent (or also called depletor) that induces an osmotic pressure difference between pigment-pigment and pigment-depletor molecules. As a result, an internal phase inside a microcapsule separates into pigment rich phases and a depletor rich phase. However, the large pigment aggregates in the pigment rich phase may cause scattering and haze when the capsules are in an open state.

Thus, there is a need for improved bistable electro-optic media that may be incorporated in variable transmission devices with acceptable switching rates and low haze.

SUMMARY OF INVENTION

In one aspect, an electro-optic media comprises a plurality of microcapsules in a binder, the microcapsules containing a dispersion, the dispersion comprising a plurality of charged composite particles and a suspending fluid, and the charged composite particles move through the suspending fluid under the influence of an electric field. The composite particles comprise one or more pigment particles selected from the group consisting of manganese ferrite black spinel, copper chromite black spinel, carbon black, and combinations thereof and are at least partially coated with a polymeric material. Each of the binder, the charged composite particles, and the suspending fluid have an index of refraction, and a difference between the index of refraction of the composite particles and at least one of the binder and suspending fluid is less than or equal to 0.05 at 550 nm.

In another aspect, an electro-optic media comprises a polymeric sheet containing a plurality of sealed microcells, each microcell containing a dispersion, the dispersion comprising a plurality of charged composite particles and a suspending fluid, and the charged composite particles move through the suspending fluid under the influence of an electric field. The composite particles comprise one or more pigment particles selected from the group consisting of manganese ferrite black spinel, copper chromite black spinel, carbon black, and combinations thereof and are at least partially coated with a polymeric material. Each of the polymeric sheet, the charged composite particles, and the suspending fluid have an index of refraction, and a difference between the index of refraction of the composite particles and at least one of the polymeric sheet and suspending fluid is less than or equal to 0.05 at 550 nm.

In yet another aspect, an electro-optic media comprises a plurality of droplets in a continuous polymeric phase, each droplet containing a dispersion, the dispersion comprising a plurality of charged composite particles and a suspending fluid, and the charged composite particles move through the suspending fluid under the influence of an electric field. The composite particles comprise one or more pigment particles selected from the group consisting of manganese ferrite black spinel, copper chromite black spinel, carbon black, and combinations thereof and are at least partially coated with a polymeric material. Each of the continuous polymeric phase, the charged composite particles, and the suspending fluid have an index of refraction, and a difference between the index of refraction of the composite particles and at least one of the continuous polymeric phase and suspending fluid is less than or equal to 0.05 at 550 nm.

These and other aspects of the present invention will be apparent in view of the following description.

BRIEF DESCRIPTION OF DRAWINGS

The drawing Figures depict one or more implementations in accord with the present concepts, by way of example only, not by way of limitations.

DETAILED DESCRIPTION

Generally, the various embodiments of the present invention provide an electro-optic medium comprising an encapsulated dispersion of charged composite particles and a suspending fluid, wherein the charged composite particles move through the suspending fluid under the influence of an electric field. The composite particles are preferably composed of pigment particles imbedded in a polymeric material. The optical properties of the medium are controlled by the pigment particle type and size and the type and thickness of the polymeric coating. The index of refraction of the fluid is preferably matched to the overall index of refraction of the composite particle, so that the size of the composite particle does not affect the scattering of light and, therefore, does not contribute to the level of haze. At the same time, the composite particles are large enough to provide good electrophoretic control of the system. Furthermore the polymer coating provides separation between pigment particles to inhibit the formation of a large aggregate that may produce haze.

Figure 1:
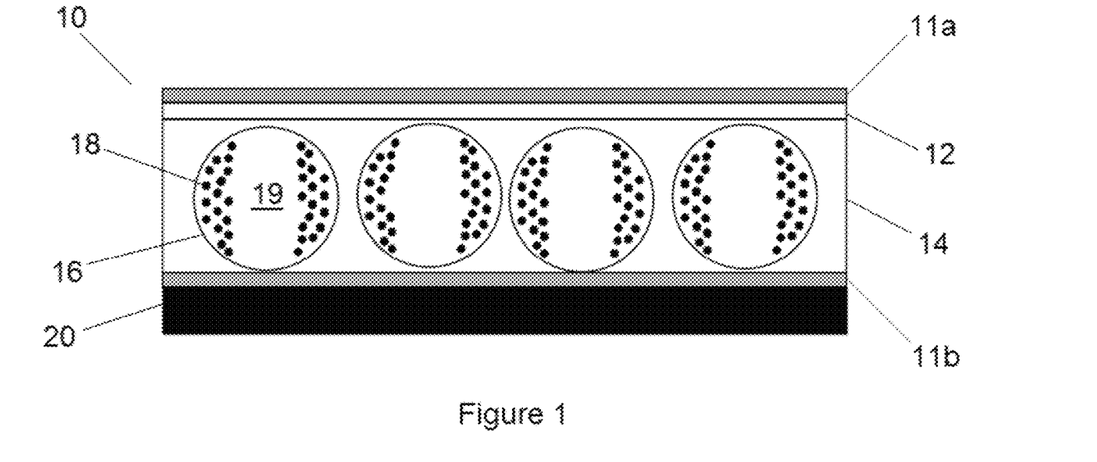
FIG. 1 is an illustration of a variable transmission device including first and second light-transmissive electrode layers with an electro-optic medium disposed between the layers. The particles can be moved adjacent to the capsule walls with the application of an electric field, thereby allowing light to pass through the medium, i.e. an open state.

For variable transmission devices, electrophoretic devices can be made to operate in a so-called "shutter mode," illustrated in FIG. 1, wherein one operating state is substantially opaque and another operating state is light transmissive. When this "shutter mode" electrophoretic device is constructed on a transparent substrate, it is possible to regulate transmission of light through the device.

The device 10 of FIG. 1 is illustrated in the open state. The device 10 includes an electro-optic medium comprising capsules 16 in a polymeric binder 14. The capsules 16 contain a dispersion comprising charged pigment particles 18 in a suspending fluid 19 that move in response to an electric field. The capsules 16 are typically formed from gelatin materials described in greater detail below. The layer of electro-optic medium is preferably in proximity to a layer of light transmissive conductive material, more preferably the layer of electro-optic medium is disposed between first and second layers light transmissive conductive layers, such as electrode layers 11$a$, 11$b$ in FIG. 1, which may be made from known materials such as indium-tin oxide (ITO) coated polyethylene terephthalate (PET). Alternatively, an electrode layer may comprise metal electrodes, which may be arranged as pixels. The pixels may be controllable as an active matrix, thereby allowing switching of discrete areas of the device. An additional adhesive layer 12 is typically present between the electro-optic medium and one of the electrode layers 11$a$, 11$b$. The adhesive layer may be UV curable, and typically improves the planarity of the final device by filling in deviations created by the capsules. Suitable adhesive formulations are described in U.S. 2017/0022403, which is incorporated by reference herein. The device 10 may further comprise at least one light-transmissive substrate 20 on the opposed side of one of the layers of conductive material 11$a$, 11$b$ from the electro-optic medium; obviously, such a substrate may be provided for each of the electrode layers.

When a DC field is applied to the device 10 of FIG. 1, the particles 18 move toward the viewing surface, thereby changing the optical state from dark to light. In FIG. 1, when an alternating electric field is applied to one of the electrodes 11$a$, 11$b$, the charged pigment particles 18 are driven to the walls of the capsule 16, resulting in an aperture through the capsule 16 for the transmission of light, i.e., an open state. By using a non-polar solvent as the suspending fluid 19 that also includes charge control agents and/or stabilizers, the optical state (open/closed) can be maintained for long periods of time (weeks) without the need to maintain the electric field. As a result, the devices may be "switched" only a couple of times a day and consume very little power. In the case of the shutter mode devices discussed below, the two extreme optical states may be referred to as "dark" and "clear" or "open" and "closed".

Numerous patents and applications assigned to or in the names of the Massachusetts Institute of Technology (MIT), E Ink Corporation, E Ink California, LLC. And related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387, 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904, 7,580,180; 7,679,814; 7,746,544; 7,767,112; 7,848,006; 7,903,319; 7,951,938; 8,018,640; 8,115,729; 8,119,802; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915, 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/0281924; 2007/0268567, 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/0248045; 2015/0301425; 2015/0378236; 2016/0139483; and 2016/0170106;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445; and (i) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. Nos. 6,866,760 and 7,079,305. Accordingly, for purposes of the present application, such polymer-dispersed electrophoretic media are regarded as sub-species of encapsulated electrophoretic media.

Charged pigment particles may be of a variety of colors and compositions.

Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5 at 550 nm) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entireties.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA® 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly(ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state.

Figure 2A:
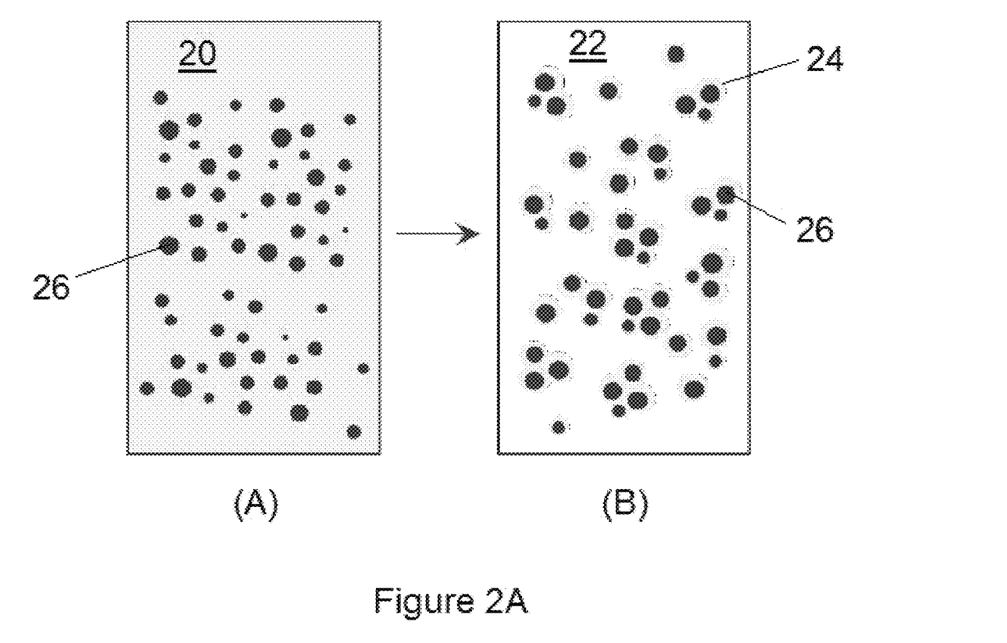
FIG. 2A is a schematic of a process for making composite particles according to one embodiment of the present invention.

According to one aspect of the present invention, an electro-optic medium containing a composite pigment particle and methods for producing the composite pigment particle are provided with tunable surface charge and low haze in the presence of a flocculating agent. The composite particles may be synthesized through seeded dispersion polymerization in non-polar solvents, such that organic polymer is deposited onto the surface of seed particles, as schematically illustrated in FIG. 2A. The resulting composite particles are in dimensions on the order of a few hundred nanometers at which electrophoretic and dielectrophoretic switching is effective, as well as state stabilization by means of depletion flocculation. The pigment particles preferably have a diameter of about 0.01 to 0.2 µm, and the polymeric material coated on the surface of the pigment particles may have a thickness of about 0.5 to 2 µm, more preferably a thickness of about 0.3 to 0.7 µm. The overall diameter of the composite particles may be less than 5 µm, more preferably about 0.5 to 2 µm, and most preferably about 0.5 to 1 µm.

The composite pigment particles according to a first embodiment of the present invention may be synthesized in non-polar solvents that can easily be mixed with other components to create an internal phase suitable for an encapsulation process. Without wishing to be bound to theory, it is believed that by embedding seed pigments in a polymeric matrix, the electro-optical properties of the pigments are decoupled from their surface characteristics and charge properties. As a result, the refractive index of the pigment particles may be modified in a manner that also improves the motility of the pigment particles.

In a first step, a dense suspension is prepared by grinding the pigment particles in a non-polar solvent or a mixture of two or more solvents. Examples of solvents include, but are not limited to, aliphatic hydrocarbons such as heptane, octane, and petroleum distillates such as Isopar® (Exxon Mobil) or Isane® (Total), terpenes such as limonene, e.g., -limonene; and aromatic hydrocarbons such as toluene. Optional surfactants may be incorporated in the dispersion to assist with the grinding process (e.g. 1.0 g surfactant/g pigment). The suspension may contain 10 to 50 wt % of the pigment particles, more preferably 15 to 35 wt %, and most preferably about 25 wt %.

Second, the pigment suspension may be diluted with a solvent, such as Isopar E or hexane, and an optional charge control agent previously mentioned, such that the pigment concentration is lowered below 15 wt %, more preferably less than 10 wt %, and most preferably less than about 6.0 wt %. It is preferred that the weight ratio of the non-polar solvent in the suspension to the dilution solvent is less than or equal to 20.0 wt %.

In a third step, the diluted suspension is agitated and heated prior to adding a mixture of one or more monomers and/or oligomers and one or more initiators. The volume ratio of the monomer solution to the pigment, Vpolymer/Vseed, is preferably from about 1.0 to about 10.0. The monomer mixture preferably comprises at least three different monomers that include, but are not limited to, acrylates and methacrylates (e.g. methylmethacrylate, hexanediol dimethacrylate, trifluroroethyl methacrylate, trimethoxysilylpropyl methacrylate, tert-butyl methacrylate, isobutyl methacrylate, benzyl methacrylate, 2-fluoroethyl methacrylate, trifluoroethyl acrylate, heptafluorobutyl acrylate, heptafluoroisopropyl acrylate, 2-methoxyethyl acrylate), and oligomers thereof. The initiators that may be included in the monomer mixture include, but are not limited to azobisobutyronitrile, 2,2'-azobis(2,4-dimethyl)valeronitrile, benzoyl peroxide, tert-butyl peroxyneodecanoate, diisopropyl peroxydicarbonate, methyl ethyl ketone peroxide, tert-butyl peroxypivalate, and combinations thereof. The concentration of initiator in the monomer mixture is preferably less than or equal to about 5%, more preferably less than or equal to about 3%, and most preferably less than or equal to about 1.5 wt % based on the total monomer weight. Referring to FIG. 2A, the mixture 20 containing the pigment particles 26, non-polar solvent 22, monomers, initiator, and charge control agent is heated and agitated to allow polymerization of the monomer, such that the pigment particles 26 are at least partially, preferably completely, coated with the resulting polymer 24 to form the composite particles. After polymerization, the composite particles may be washed and dried.

Figure 2B:
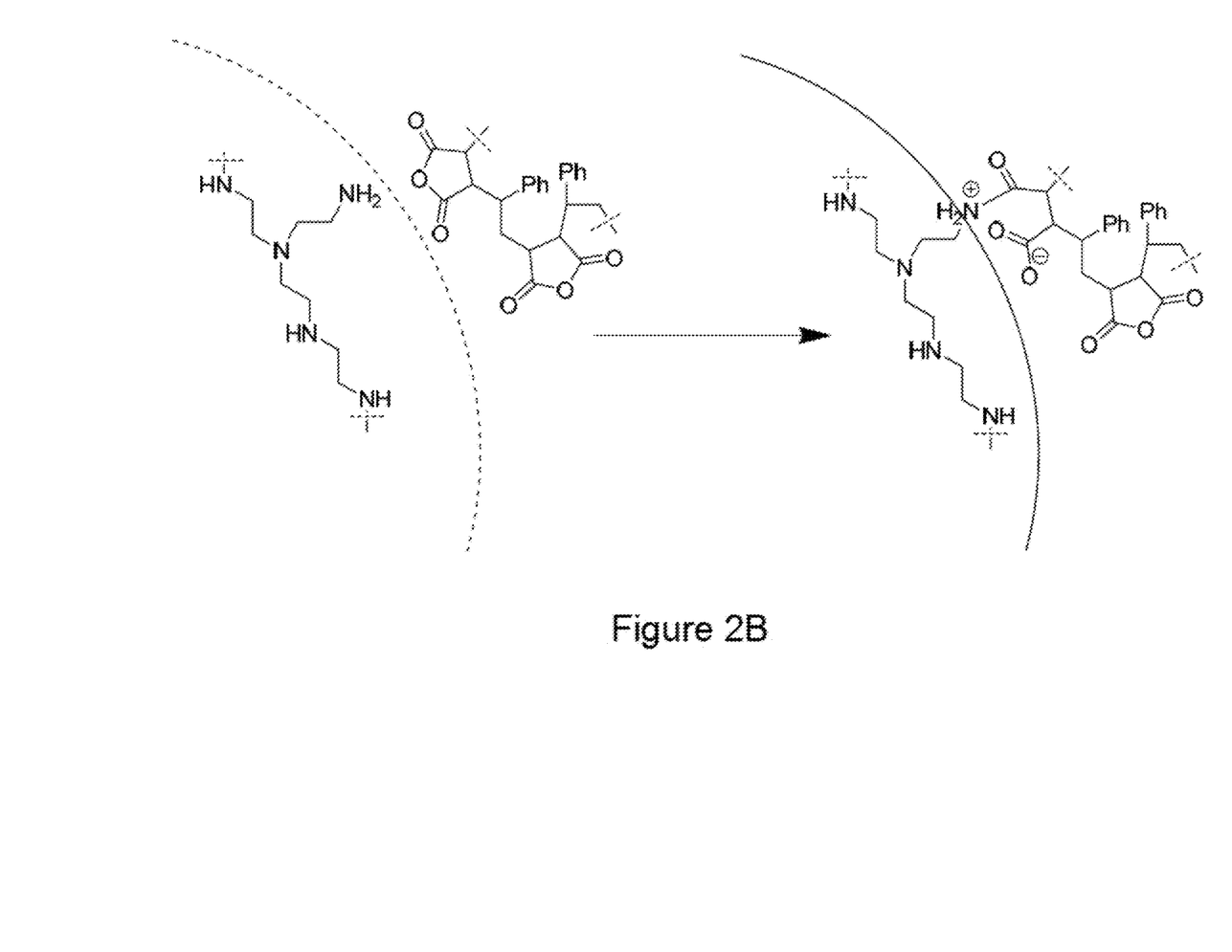
FIG. 2B is a schematic of a second process for making composite particles according to another embodiment of the present invention.

Another process according to a second embodiment of the present invention for preparing the composite particles utilizes an aqueous process. In a first step, the pigment particles are dispersed in an aqueous solution to form a nano-disperse phase (NDP) containing an optional dispersant if necessary, and polyethyleneimine ("PEI") is added to the NDP. In a second step, the NDP is emulsified into a nonpolar continuous phase of propyl benzoate and/or methyl benzoate with a dissolved surfactant poly(hydroxystearic acid) ("PHSA"). In a third step, a solution containing styrene/maleic anhydride copolymer ("SMA") in propyl benzoate and/or methyl benzoate is added to emulsion, and the SMA copolymer is allowed to react with the PEI, such that the interfacial reaction product forms a gel network or shell around a droplet of the aqueous pigment dispersion. A schematic of the interfacial reaction is illustrated in FIG. 2B. In an optional fourth step, the surface of the composite, i.e. aqueous pigment dispersion having the PEI-SMA shell, is functionalized by adding lauroyl chloride. The lauroyl chloride will react with any unreacted amine groups in the PEI and make the composite surface more hydrophobic.

The aforementioned aqueous process may be modified in several respects. For example, the PEI may be replaced with another water soluble amine-containing compound having a refractive index of about 1.5 at 550 nm and sufficient amine functionality to produce a gel network as a result of the interfacial reaction. Similarly, SMA may be replaced with another polymer having a refractive index of about 1.5 at 550 nm and sufficient anhydride functionality to promote a gel network. Furthermore, the refractive index or hydrophobicity of the SMA may be adjusted by forming a custom copolymer synthesized by modifying the amount of styrene and/or maleic anhydride, and/or incorporating other monomeric units into the copolymer such as ethylene, lauryl methacrylate, or trifluoroethylmethacrylate. In one exemplary embodiment, the pigment particles may be coated with a polymeric material having a refractive index greater than or equal to 1.5 at 550 nm, although broader refractive index ranges, for example greater than or equal to 1.43, 1.44, 1.45, 1.46, 1.47, 1.48, or 1.49 are also contemplated. Unless otherwise stated, index ranges reported herein are measured at temperatures between 20° C. to 30° C.

It may also be desirable to modify the SMA before the interfacial reaction, depending on the ultimate choice of solvent in which the composite particles will be dispersed. For example, if the composite particles are to be dispersed ultimately in an alkane like Isopar, alkane groups could be added to the SMA to improve its compatibility in the solvent. Finally, rather than form an aqueous dispersion, the pigment particles may be dispersed in glycerol or other polyols to form the NDP.

As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The fluids used in the variable transmission media of the present invention will typically be of low dielectric constant (preferably less than 10 and desirably less than 3). The fluids are preferably solvents that have low viscosity, relatively high refractive index, low cost, low reactivity, and low vapor pressure/high boiling point. The suspending fluid is preferably a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291.

Examples of solvents that may be incorporated in the suspending fluid of the electro-optic media according to various embodiments of the present invention include, but are not limited to, aliphatic hydrocarbons such as heptane, octane, and petroleum distillates such as Isopar® (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of the index matching agents. For example, the aforementioned U.S. Pat. No. 7,679,814 describes an electrophoretic medium suitable for use in a variable transmission device in which the fluid surrounding the electrophoretic particles comprises a mixture of a partially hydrogenated aromatic hydrocarbon and a terpene, a preferred mixture being d-limonene and a partially hydrogenated terphenyl, available commercially as Cargille® 5040 from Cargille-Sacher Laboratories, 55 Commerce Rd, Cedar Grove N.J. 07009. In the encapsulated media made according to various embodiments of the present invention, it is preferred that the refractive index of the encapsulated dispersion match as closely as possible to that of the encapsulating material to reduce haze. In most instances, it is beneficial to have an internal phase with an index of refraction of at least 1.50 at 550 nm, more preferably between 1.51 and 1.57 at 550 nm, and most preferably about 1.54 at 550 nm.

In a preferred embodiment of the present invention, the encapsulated fluid may comprise one or more nonconjugated olefinic hydrocarbons, preferably cyclic hydrocarbons. Examples of nonconjugated olefinic hydrocarbons include, but are not limited to terpenes, such as limonene; phenyl cyclohexane; hexyl benzoate; cyclododecatriene; 1,5-dimethyl tetralin; partially hydrogenated terphenyl, such as Cargille® 5040; phenylmethylsiloxane oligomer; and combinations thereof. A most preferred composition for the encapsulated fluid according to an embodiment of the present invention comprises cyclododecatriene and a partially hydrogenated terphenyl.

The gelatin-based capsule walls used in the variable transmission devices have been described in many of the E Ink and MIT patents and applications mentioned above. The gelatin is available from various commercial suppliers, such as Sigma Aldrich or Gelitia USA. It can be obtained in a variety of grades and purity depending upon the needs of the application. Gelatin primarily comprises collagen that has been collected from animal products (cow, pig, poultry, fish) and hydrolyzed. It comprises a mixture of peptides and proteins. In many of the embodiments described herein the gelatin is combined with acacia (gum arabic), which is derived from the hardened sap of the acacia tree. Acacia is a complex mixture of glycoproteins and polysaccharides, and it is often used as a stabilizer in food stuffs. The pH of aqueous solutions of acacia and gelatin can be tuned to form a polymer-rich coacervate phase that can encapsulate droplets of a non-polar internal phase, as described below.

Capsules incorporating gelatin/acacia may be prepared as follows; see, for example U.S. Pat. No. 7,170,670, incorporated by reference in its entirety. In this process, an aqueous mixture of gelatin and/or acacia is emulsified with a hydrocarbon internal phase (or other water-immiscible phase which it is desired to encapsulate) to encapsulate the internal phase. The solution may be heated to 40° C. prior to emulsification to dissolve the gelatin. The pH is typically lowered to form a coacervate after the desired drop size distribution is achieved. Capsules are formed upon controlled cooling and mixing of the emulsion—typically to room temperature or lower. Proper mixing and certain encapsulation formulations (e.g. gelatin & acacia concentrations & pH) to discretely gel the coacervate around the internal phase droplets in a uniform manner are achieved if the wetting and spreading conditions are correct, which is largely dictated by the internal phase composition. The process yields capsules in the range of 20-100 μm and often incorporates over 50 percent of the starting materials into useable capsules. The capsules produced are then separated by size by sieving or other size exclusion sorting. Capsules larger than 100 μm are typically excluded because they are visible to the naked eye, and larger capsules increase the gap between electrodes, which increases the necessary drive voltage.

After size sorting, the capsules may be mixed with a binder to create a slurry for coating, e.g., using slot coating, knife coating, spin coating, etc. The binder preferably has an index of refraction of at least 1.5 nm at 550 nm. Examples of binder materials include, but are not limited to, water-soluble polymers (e.g. polysaccharides, the polyvinyl alcohols, N-methyl Pyrollidone, N-vinyl pyrollidone, the various Carbowax® species (Union Carbide, Danbury, Conn.), and poly-2-hydroxyethylacrylate), water-borne polymers (e.g. latices of polyurethanes, optionally compounded with one or more acrylics, polyesters, polycarbonates or silicones), oil-soluble polymers, thermoset and thermoplastic polymers, radiation-cured polymers, and combinations thereof. In particular, a mixture of fish gelatin and a polyanion, such as acacia has been found to be an excellent binder for use with capsules formed from a coacervate of (pig) gelatin and acacia. Polyanions that may be included in the binder with fish gelatin include, but are not limited to, carbohydrate polymers, such as starch and cellulose derivatives, plant extracts (e.g. acacia), and polysaccharides (e.g. alginate); proteins, such as gelatin or whey protein; lipids, such as waxes or phospholipids; and combinations thereof. In some embodiments of the present invention, the electrophoretic media may comprise a capsule to binder weight ratio of about 15:1 to about 50:1. In other embodiments of the present invention, the electrophoretic media may contain a higher proportion of binder, such as at least 1 part by weight of binder for each 15 parts by weight of capsules up to 1 part by weight of binder for each 4 parts by weight of capsules.

The index of refraction of the composite particles incorporated in the dispersions described above may be tuned to match the index of refraction of at least one of the suspending fluid and the binder. Preferably, each of the binder, the charged composite particles, and the suspending fluid have an index of refraction, and a difference between the index of refraction of the composite particles and at least one of the binder and suspending fluid is less than or equal to 0.05 at 550 nm. More preferably, the difference between the index of refraction of the composite particles and both indices of refraction of the binder and suspending fluid is less than or equal to 0.05 at 550 nm.

As noted above, instead of microencapsulation, various embodiments of the present invention may incorporate the electrophoretic dispersions in a polymer-dispersed layer, in which a plurality of discrete droplets of the electrophoretic fluid is dispersed within a continuous phase of a polymeric material. In a polymer-dispersed layer, the charged composite particles, suspending fluid, and continuous phase preferably have an index of refraction, and a difference between the index of refraction of the composite particles and at least one, preferably both, index of refraction of the continuous polymer phase and suspending fluid is less than or equal to 0.05 at 550 nm. Alternatively, the electrophoretic fluid may be sealed within a plurality of microcells formed from a polymeric sheet wherein a difference between the index of refraction of the composite particles and at least one, preferably both, index of refraction of the suspending fluid and polymeric sheet is less than or equal to 0.05 at 550 nm.

EXAMPLES

Examples are now given, though by way of illustration only, to show details of preferred composite particles of the present invention.

Example 1

A suspension of carbon black (Raven 3500 manufactured by Birla Carbon U.S.A. Inc. of Marietta, Ga.) in limonene and OLOA11000 was first prepared. The suspension containing a carbon black at concentration of 25 wt % and 12.5 wt % of OLOA11000 was dispersed and ground until the particle size of the carbon black was about 120 nm. The suspension was then used to prepare two groups of composite particles.

The first group of composite particles was prepared using a Vpolymer/Vseed ratio of 1.5 by mixing 150 g of the suspension with 570.0 g of Isopar E followed by heating and mixing the diluted suspension with a monomer mixture of 44.99 g of methylmethacrylate (MMA), 5.62 g of hexanediol dimethacrylate (HDDM), 5.62 g trifluoroethyl methacrylate (TFEM), and 0.84 g of azobisobutyronitrile (Init.). After polymerization, the composite particles were washed and dried.

The second group of composite particles was prepared using a Vpolymer/Vseed ratio of 2.0 by mixing 75 g of the suspension with 570.0 g of Isopar E followed by heating and mixing the diluted suspension with a monomer mixture of 37.49 g of methylmethacrylate, 4.69 g of hexanediol dimethacrylate, 4.69 g trifluoroethyl methacrylate, and 0.70 g of azobisobutyronitrile. After polymerization, the composite particles were washed and dried.

Figure 3A:
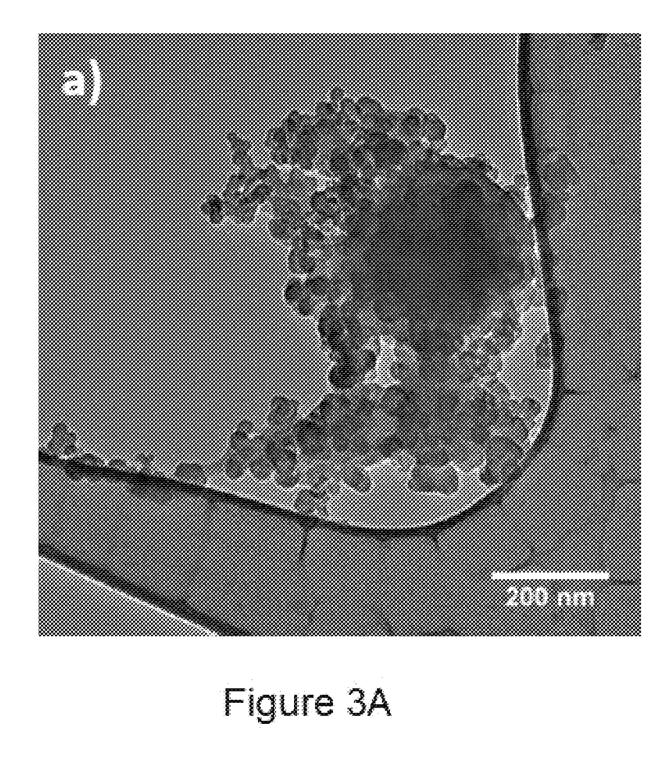
FIGS. 3A and 3B are transmission electron micrographs of the microstructure of composite particles according to various embodiments of the present invention.
Figure 3B:
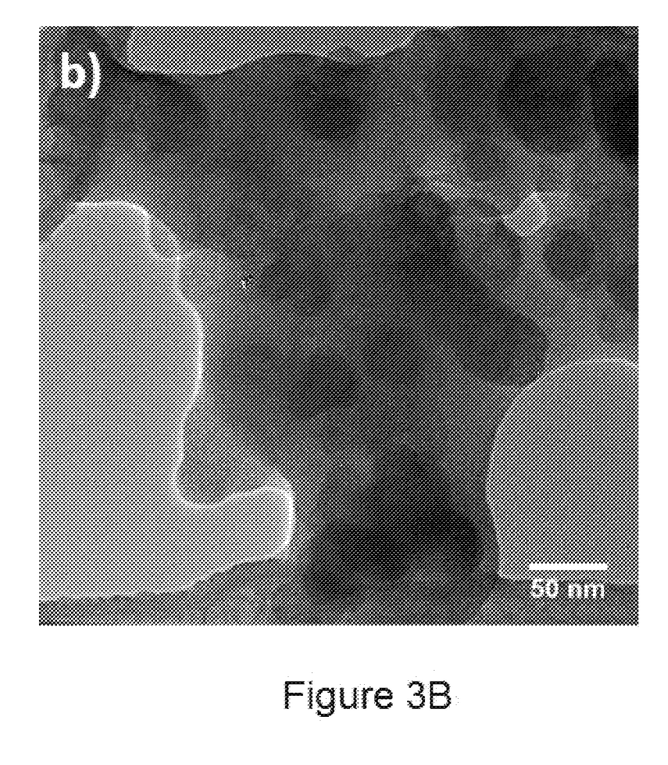

The microstructures of the resulting composite particles may be observed in the transmission electron micrographs of FIGS. 3A and 3B. The composite particles manufactured using the lower volume ratio of 1.5 in FIG. 3A were only partially coated, while the particles manufactured using a higher volume ratio of 2.0 in FIG. 3B were completely engulfed by polymer.

Example 2

A second suspension was prepared using carbon black (Raven 1200 manufactured by Birla Carbon U.S.A. Inc. of Marietta, Ga.) in limonene and OLOA11000. The suspension containing a carbon black concentration of 25 wt % and 12.5 wt % of OLOA11000 was dispersed and ground until the particle size of the carbon black was about 115 nm.

Figure 4A:
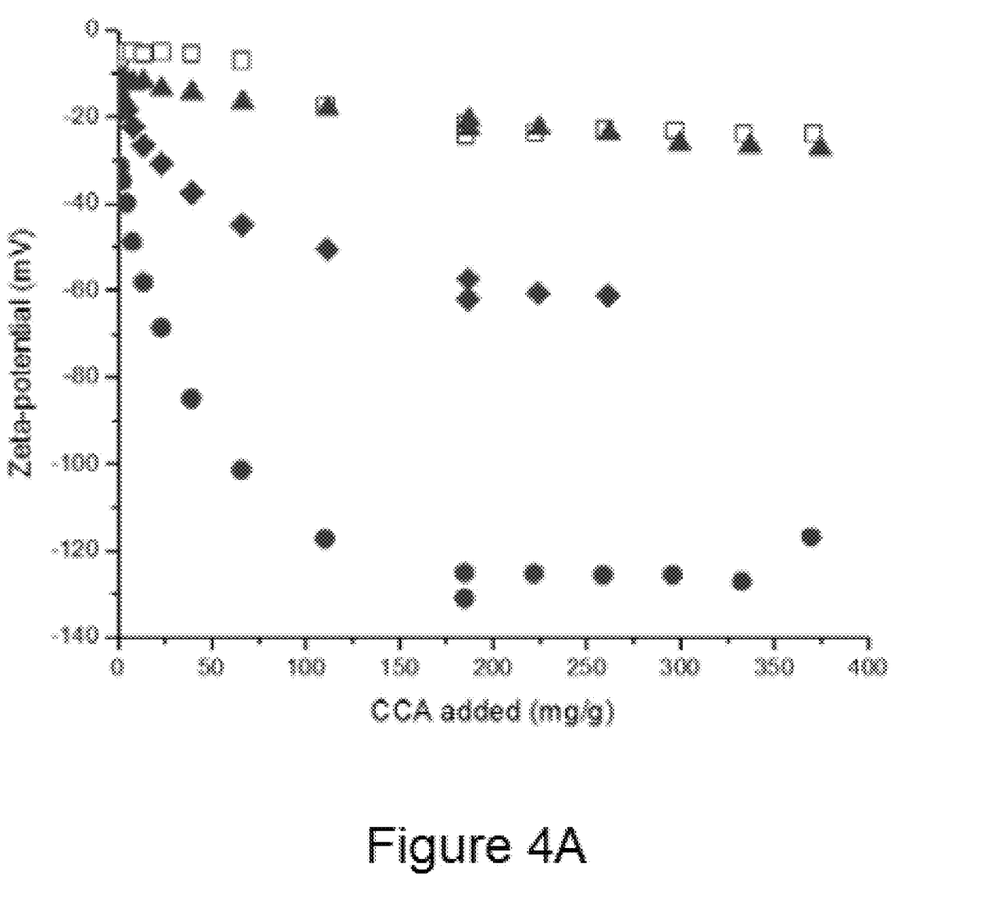
FIGS. 4A and 4B are plots of zeta-potential of carbon black versus composite pigments according to various embodiments of the present invention as a function of charge control agent concentration.
Figure 4B:
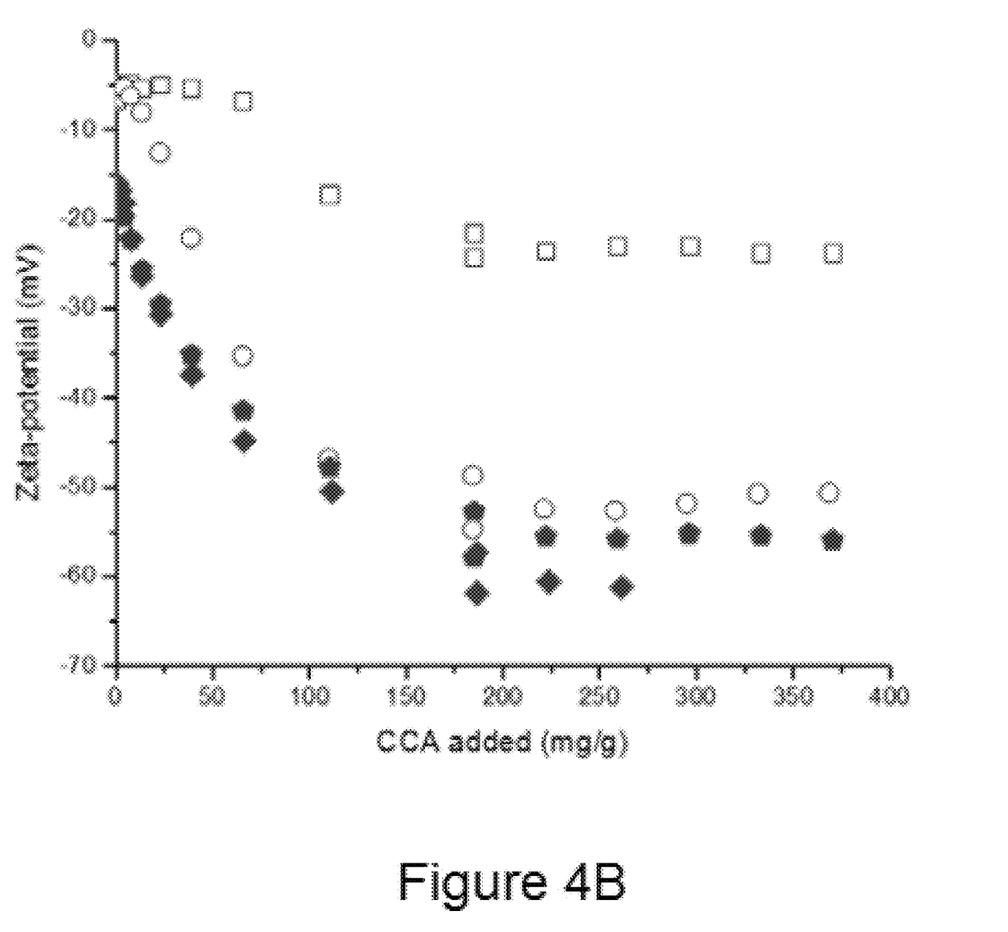

In order to examine the effects of the charge control agent (CCA) concentration on the composite particles, various samples of composite particles were prepared using the same procedure for the first group of composite particles in Example 1, except that the pigment suspension and types and amounts of monomers were slightly modified for some samples. The type and amount (g) of pigment suspension, as well as the types and amounts (g) of monomers, used to produce each of the samples is provided in the following table:

| Raven 3500 Susp. | Raven 1200 Susp. | MMA | TFEM | TMSPM* | HDDM | Symbol in FIG. 4A | Symbol in FIG. 4B |
|---|---|---|---|---|---|---|---|
| 150 | — | 50.62 | — | — | 5.62 | ▲ | |
| 150 | — | 47.81 | 2.81 | — | 5.62 | ♦ | ♦ |
| 150 | — | 44.99 | — | 5.62 | 5.62 | ● | |
| — | 150 | 44.99 | 5.62 | — | 5.62 | | ♠ |

*trimethoxysilylpropyl methacrylate

Four separate 5 wt. % dispersions were prepared, each containing one of the groups of composite particles prepared according to the procedures described Table 1, in limonene. Two control samples, a 5 wt. % suspension of Raven 3500 in limonene and a 5 wt. % suspension of Raven 1200 in limonene, were also prepared. The charging ability of each of the composite particles was determined by using an Acoustosizer II X and M (Colloidal Dynamics) to measure the speed of sound, the density, and the viscosity of the suspension. With this data, the zeta-potential of the pigment particles was calculated. In order to monitor how the zeta-potential changes with CCA loadings, the dispersion was titrated by adding additional CCA with a starting dose of 0.02 mL. Plots of the zeta potential for the control suspension containing Raven 3500 in FIGS. 4A and 4B are represented using the symbol "□" and for the control suspension containing Raven 1200 in FIG. 4B is represented using the symbol "○."

Referring to the results in FIGS. 4A and 4B, it was observed that the control suspensions containing Raven 3500 exhibited very little change in zeta potential as the amount of CCA increased. When copolymerized with functional monomers such as trifluoroethylmethacrylate or trimethoxysilylpropyl mechacrylate, however, a dramatic increase in charging level was observed. For example, as shown in FIG. 4A, the zeta potential of composite particles containing poly(MMA-co-TMSPM) dropped to about −130 mV at approximately 20% mass ratio of CCA to composite particles (10 mg/g). When two different types of carbon black pigments with different charging levels were coated with a same copolymer composition, the resulting particles displayed a similar charging level, such as the Raven 3500 and Raven 1200 pigments encapsulated in poly(MMA-co-TFEM in FIG. 4B. From this measurement, we conclude that the surface potential of the composite particles may be tunable and may be dominated by the types of monomers that compose the shell and matrix of composite particles.

Example 3

Figure 5:
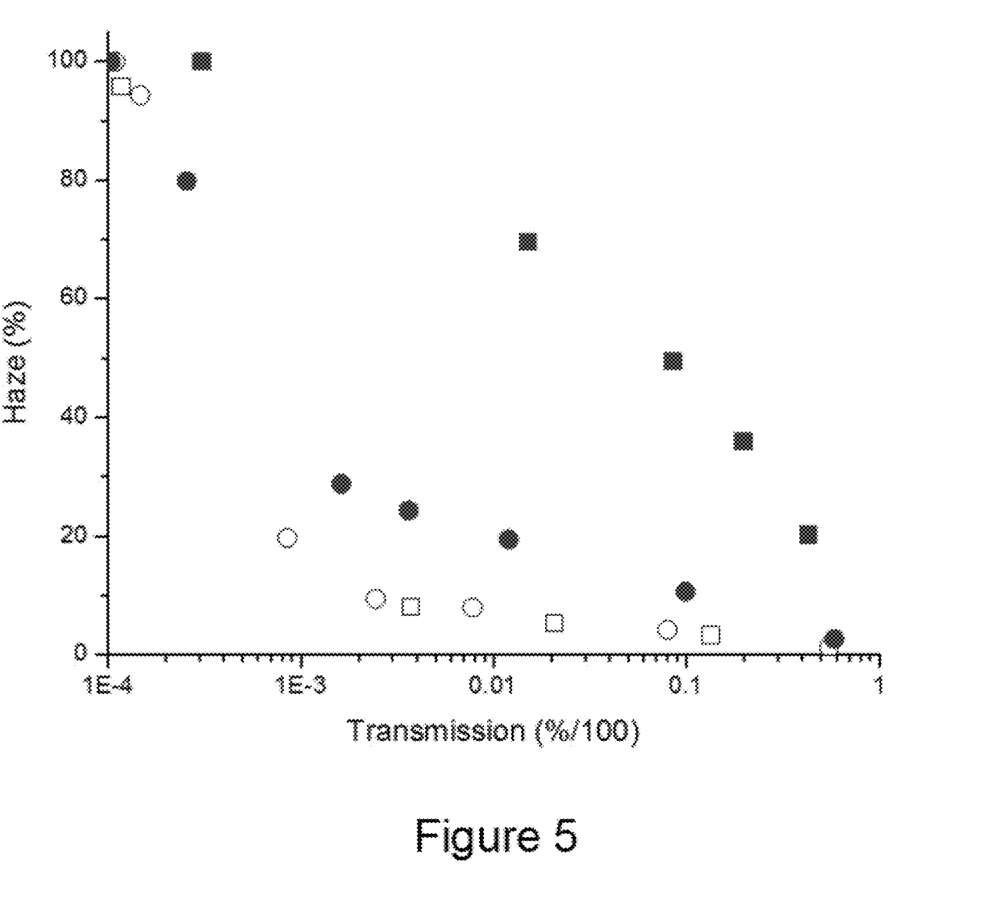
FIG. 5 is a plot of haze versus transmission of encapsulated dispersions containing either composite particles according to an embodiment of the invention or pigment in the absence and in the presence of flocculating polymer.

In order to determine the effect on haze for the pigment particles, a 1.0 wt % hybrid pigment dispersion in limonene was prepared using the pigment particles comprising Raven 3500 encapsulated in a copolymer of MMA-TFEM) prepared according to Example 2. A second control sample of a 1.0 wt % dispersion of carbon black (Raven 3500) was also prepared. Various samples of the two dispersions were then diluted with a mixture of solvents (hydrogenated terphenyls/limonene 1/1, w/w)) with or without a flocculating polymer (polystyrene, Mw~35,000), such that the pigment concentration of the samples varied from 0.5 to 0.01 wt %. Each sample was mixed and poured into a transparent liquid container and allowed to flocculate for 10 min prior to measuring the transmission and haze of light through the container using a spectrophotometer (CM-3600A, Konica Minolta). FIG. 5 is a plot of the haze versus transmission data for the control sample (square symbols) and composite pigment particle (circle symbols) in the presence (closed symbols) and absence (open symbols) of the flocculating polymer. As illustrated in FIG. 5, the composite pigment particles in the presence of flocculating polymer performed more closely to the dispersions lacking flocculating polymer than the control sample.

Example 4

Aqueous Process 1: An NDP was first formed by using either pre-dispersed pigments Cab-o-Jet 465M magenta or 450C cyan (received as 15 wt %/o dispersions in water), or dry Emperor 2000 carbon black (received as a dry powder). The carbon black was dispersed in water at 20 wt % pigment, 10 wt % dispersant Kolliphor P188, by blending the pigment into the dispersant solution, then sonicating the mixture. The particle size in this stock was about 80 nm, as determined by dynamic light scattering. These pigment dispersions were each blended with a 50 wt % aqueous solution of PEI (branched, 1200 MW, from Sigma) and additional water, for a final NDP comprising 5 wt % pigment, 5 wt % PEI, 2.5 wt % dispersant if present, and the remainder water.

Next, 10 g of NDP was emulsified into 100 g of propyl benzoate in a 500 ml glass reactor, first using an impeller for an initial coarse emulsion, then reaching the final droplet size by using a rotor-stator homogenizer (IKA 1 cm rotor-stator run at 7,000-10,000 RPM for 3 minutes). After the rotor-stator mixing, we resumed stirring by impeller at 300 RPM for the rest of the process.

Finally, 25 g of SMA at 1600 MW dissolved at 1% wt in propyl benzoate was injected through a pipette below the liquid surface of the emulsion over 5-10 minutes with continued stirring for at least 60 minutes.

In a final step, the composite particles were hydrophobized by adding 10 g of 5 wt % lauroyl chloride in propyl benzoate to react with leftover amine groups in the PEI and continued stirring the mixture 60 more minutes, then transferred the mixture to a polypropylene bottle and rolled it on a roll mill overnight.

Aqueous Process 2: The Aqueous Process 1 was repeated except that the SMA was modified by adding 3.3 g of 10 wt % oleylamine in propyl benzoate to 25 g of 1 wt % SMA in propyl benzoate while stirring. This solution (28.3 g) was used as a replacement for the 25 g of unmodified SMA solution in Aqueous Process 1.

Figure 6A:
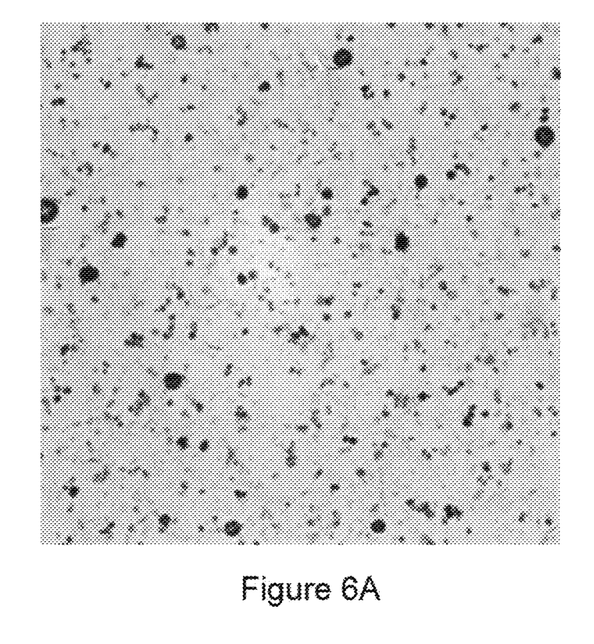
FIGS. 6A and 6B are photomicrographs of encapsulated composite particles made using an aqueous process according to another embodiment of the present invention.
Figure 6B:
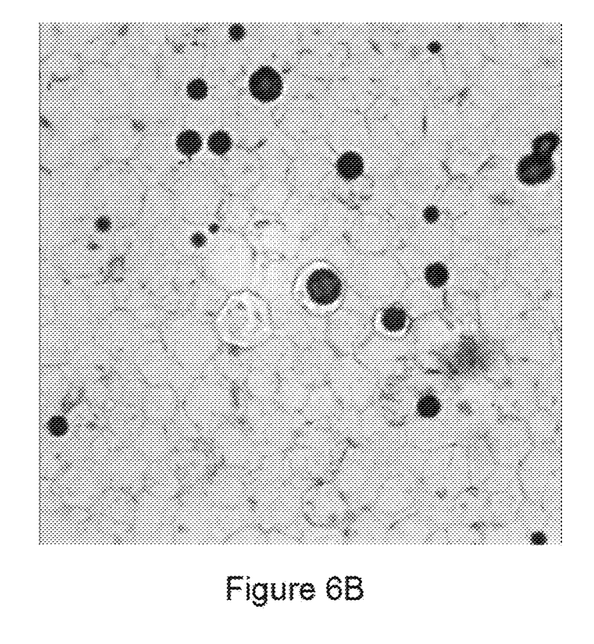

Photomicrographs of the resulting composite particles are provided in FIG. 6A (pigment composites made from oleylamine-functionalized SMA) and FIG. 6B (unfunctionalized SMA). Comparing the photomicrographs, the particles prepared with functionalized SMA had a somewhat higher rate of successful micro-encapsulation than the particles prepared using unfunctionalized SMA.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The contents of all of the aforementioned patents and applications are incorporated by reference herein in their entireties.

We claim:

1. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field, wherein the composite particles comprise one or more pigment particles at least partially coated with a polymeric material, the pigment particles being selected from the group consisting of manganese ferrite black spinel, copper chromite black spinel, carbon black, and combinations thereof, the pigment particles having a diameter of 0.01 to 0.2 µm; and each of the binder, the composite particles, and the suspending fluid have an index of refraction, and a difference between the index of refraction of the composite particles and the index of refraction of at least one of the suspending fluid and binder is less than or equal to 0.05 at 550 nm.

2. The electro-optic media of claim 1, wherein the pigment particles comprise carbon black.

3. The electro-optic media of claim 1, wherein the polymeric material comprises polymethyl methacrylate.

4. The electro-optic media of claim 1, wherein the polymeric material has a thickness of 0.3 to 0.7 µm.

5. The electro-optic media of claim 1, wherein the suspending fluid comprises a solvent selected from the group consisting of aliphatic hydrocarbons, terpenes, aromatic hydrocarbons, and combinations thereof.

6. The electro-optic media of claim 1, wherein the binder is selected from the group consisting of water-soluble polymers, water-borne polymers, oil-soluble polymers, thermoset and thermoplastic polymers, radiation-cured polymers, and combinations thereof.

7. A variable transmission film comprising a layer of the electro-optic medium of claim 1 and a layer of light transmissive conductive material in proximity to the layer of electro-optic medium.

8. The variable transmission film of claim 7, wherein layer of electro-optic medium is disposed between a first and second layer of light transmissive conductive material.

9. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field,
   wherein the composite particles comprise one or more pigment particles at least partially coated with a polymeric material, the pigment particles being selected from the group consisting of manganese ferrite black spinel, copper chromite black spinel, carbon black, and combinations thereof, and
   each of the binder, the composite particles, and the suspending fluid have an index of refraction wherein each of the indices of refraction is greater than or equal to 1.5 at 550 nm, and a difference between the index of refraction of the composite particles and the index of refraction of at least one of the suspending fluid and binder is less than or equal to 0.05 at 550 nm.

10. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field,
    wherein the composite particles comprise one or more pigment particles at least partially coated with a polymeric material, the pigment particles being selected from the group consisting of manganese ferrite black spinel, copper chromite black spinel, carbon black, and combinations thereof, and
    each of the binder, the composite particles, and the suspending fluid have an index of refraction, and a difference between the index of refraction of the composite particles and the indices of refraction of the suspending fluid and the binder is less than or equal to 0.05 at 550 nm.

11. A variable transmission film comprising a layer of the electro-optic medium of claim 10 and a layer of light transmissive conductive material in proximity to the layer of electro-optic medium.

12. The variable transmission film of claim 11, wherein layer of electro-optic medium is disposed between a first and second layer of light transmissive conductive material.

13. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field,
    wherein the composite particles comprise one or more pigment particles at least partially coated with a polymeric material, wherein the polymeric material is derived from a monomer selected from the group consisting of methyl methacrylate, hexanediol dimethacrylate, trifluroroethyl methacrylate, trimethoxysilylpropyl methacrylate, tert-butyl methacrylate, isobutyl methacrylate, benzyl methacrylate, 2-fluoroethyl methacrylate, trifluoroethyl acrylate, heptafluorobutyl acrylate, heptafluoroisopropyl acrylate, 2-methoxyethyl acrylate, and combinations thereof, the pigment particles being selected from the group consisting of manganese ferrite black spinel, copper chromite black spinel, carbon black, and combinations thereof, and
    each of the binder, the composite particles, and the suspending fluid have an index of refraction, and a difference between the index of refraction of the composite particles and the index of refraction of at least one of the suspending fluid and binder is less than or equal to 0.05 at 550 nm.

14. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field,
    wherein the composite particles comprise one or more pigment particles at least partially coated with a polymeric material, wherein the polymeric material comprises the reaction product of polyethyleneamine and a copolymer comprising styrene and maleic anhydride, the pigment particles being selected from the group consisting of manganese ferrite black spinel, copper chromite black spinel, carbon black, and combinations thereof, and
    each of the binder, the composite particles, and the suspending fluid have an index of refraction, and a difference between the index of refraction of the composite particles and the index of refraction of at least one of the suspending fluid and binder is less than or equal to 0.05 at 550 nm.

15. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field,
    wherein the binder comprises fish gelatin and a polyanion
    wherein the composite particles comprise one or more pigment particles at least partially coated with a polymeric material, the pigment particles being selected from the group consisting of manganese ferrite black spinel, copper chromite black spinel, carbon black, and combinations thereof, and
    each of the binder, the composite particles, and the suspending fluid have an index of refraction, and a difference between the index of refraction of the composite particles and the index of refraction of at least one of the suspending fluid and binder is less than or equal to 0.05 at 550 µm.

16. An electro-optic media comprising a binder and a plurality of microcapsules and comprising a weight ratio of microcapsules to binder of 4:1 to 50:1, each microcapsule containing a dispersion, the dispersion comprising a plurality of charged composite particles and a suspending fluid, and the charged particles move through the suspending fluid under the influence of an electric field,
    wherein the composite particles comprise one or more pigment particles at least partially coated with a polymeric material, the pigment particles being selected from the group consisting of manganese ferrite black spinel, copper chromite black spinel, carbon black, and combinations thereof, and
    each of the binder, the composite particles, and the suspending fluid have an index of refraction, and a difference between the index of refraction of the composite particles and the index of refraction of at least one of the suspending fluid and binder is less than or equal to 0.05 at 550 µm.

17. An electro-optic media comprising a binder and a plurality of microcapsules, each microcapsule containing a dispersion, the dispersion comprising a plurality of charged composite particles and a suspending fluid, and the charged particles move through the suspending fluid under the influence of an electric field,
    wherein the composite particles comprise one or more pigment particles at least partially coated with a polymeric material wherein the index of refraction of the polymeric material is greater than or equal to 1.5 at 550 nm, the pigment particles being selected from the group consisting of manganese ferrite black spinel, copper chromite black spinel, carbon black, and combinations thereof, and
    each of the binder, the composite particles, and the suspending fluid have an index of refraction, and a difference between the index of refraction of the composite particles and the index of refraction of at least one of the suspending fluid and binder is less than or equal to 0.05 at 550 nm.

18. An electro-optic media comprising a polymeric sheet containing a plurality of sealed microcells, each microcell containing a dispersion, the dispersion comprising a plurality of charged composite particles and a suspending fluid, and the charged composite particles move through the suspending fluid under the influence of an electric field,
    wherein the composite particles comprise one or more pigment particles at least partially coated with a polymeric material, the pigment particles being selected from the group consisting of manganese ferrite black spinel, copper chromite black spinel, carbon black, and combinations thereof, and
    each of the polymeric sheet, the charged composite particles, and the suspending fluid have an index of refraction, and a difference between the index of refraction of the composite particles and the indices of refraction of the suspending fluid and the polymeric sheet is less than or equal to 0.05 at 550 nm.

19. A variable transmission film comprising a layer of the electro-optic medium of claim 18 and a layer of light transmissive conductive material in proximity to the layer of electro-optic medium.

20. The variable transmission film of claim 19, wherein layer of electro-optic medium is disposed between a first and second layer of light transmissive conductive material.

21. An electro-optic media comprising a polymeric sheet containing a plurality of sealed microcells, each microcell containing a dispersion, the dispersion comprising a plurality of charged composite particles and a suspending fluid, and the charged composite particles move through the suspending fluid under the influence of an electric field,
    wherein the composite particles comprise one or more pigment particles at least partially coated with a polymeric material wherein the index of refraction of the polymeric material is greater than or equal to 1.5 at 550 nm, the pigment particles being selected from the group consisting of manganese ferrite black spinel, copper chromite black spinel, carbon black, and combinations thereof, and
    each of the polymeric sheet, the charged composite particles, and the suspending fluid have an index of refraction, and a difference between the index of refraction of the composite particles and the index of refraction of at least one of the suspending fluid and polymeric sheet is less than or equal to 0.05 at 550 nm.

22. An electro-optic media comprising a plurality of droplets in a continuous polymeric phase, each droplet containing a dispersion, the dispersion comprising a plurality of charged composite particles and a suspending fluid, and the charged composite particles move through the suspending fluid under the influence of an electric field,
    wherein the composite particles comprise one or more pigment particles at least partially coated with a polymeric material, the pigment particles being selected from the group consisting of manganese ferrite black spinel, copper chromite black spinel, carbon black, and combinations thereof, and
    each of the continuous polymeric phase, the charged composite particles, and the suspending fluid have an index of refraction, and a difference between the index of refraction of the composite particles and the indices of refraction of the suspending fluid and the polymeric sheet is less than or equal to 0.05 at 550 nm.

23. An electro-optic media comprising a plurality of droplets in a continuous polymeric phase, each droplet containing a dispersion, the dispersion comprising a plurality of charged composite particles and a suspending fluid, and the charged composite particles move through the suspending fluid under the influence of an electric field,
    wherein the composite particles comprise one or more pigment particles at least partially coated with a polymeric material wherein the index of refraction of the polymeric material is greater than or equal to 1.5 at 550 nm, the pigment particles being selected from the group consisting of manganese ferrite black spinel, copper chromite black spinel, carbon black, and combinations thereof, and
    each of the continuous polymeric phase, the charged composite particles, and the suspending fluid have an index of refraction, and a difference between the index of refraction of the composite particles and the index of refraction of at least one of the suspending fluid and continuous polymeric phase is less than or equal to 0.05 at 550 nm.

\* \* \* \* \*